United States Patent [19]

Kruckemeyer et al.

[11] Patent Number: 4,789,051

[45] Date of Patent: Dec. 6, 1988

[54] DAMPER WITH INTERNALLY POWERED SELECTIVE RIDE VALVING

[75] Inventors: William C. Kruckemeyer; Wayne V. Fannin, both of Xenia, Ohio

[73] Assignee: General Motors Corporation, Detroit, Mich.

[21] Appl. No.: 59,014

[22] Filed: Jun. 8, 1987

[51] Int. Cl.$^4$ .............................. F16F 9/46; F16F 9/18
[52] U.S. Cl. ..................... 188/299; 188/319; 188/322.22
[58] Field of Search ............... 188/299, 319, 315, 282, 188/285, 322.13, 322.14, 322.15, 322.22, 317; 280/707; 267/120, 127, 64.15, 220

[56] References Cited

U.S. PATENT DOCUMENTS

| | | | |
|---|---|---|---|
| 3,827,538 | 8/1974 | Morgan | 188/319 |
| 4,175,771 | 11/1979 | Muzechuk et al. | 267/220 X |
| 4,376,472 | 3/1983 | Heyer et al. | 188/322.22 |
| 4,463,839 | 8/1984 | Ashiba | 188/319 X |
| 4,526,401 | 7/1985 | Kakizaki et al. | 188/299 X |
| 4,576,258 | 3/1986 | Spisak et al. | 280/707 X |
| 4,620,619 | 11/1986 | Emura et al. | 188/319 |
| 4,682,675 | 7/1987 | Eddy, Jr. | 188/299 |
| 4,685,545 | 8/1987 | Fannin et al. | 188/322.15 X |

Primary Examiner—Douglas C. Butler
Assistant Examiner—Robert J. Oberleitner
Attorney, Agent, or Firm—Charles R. White

[57] ABSTRACT

A hydraulic damper for adjusting the damping force which incorporates a piston operatively for stroking movement within a cylinder and partitioning the cylinder into separate chambers with first fluid flow control valving interconnecting said chambers for determining said damping force of said unit and fluid bypass passage extending through said neck portion of said piston for controlling the effective passage area of the bypass passage and generating a family of curves for controlling and selecting the damping force of the damper.

5 Claims, 2 Drawing Sheets

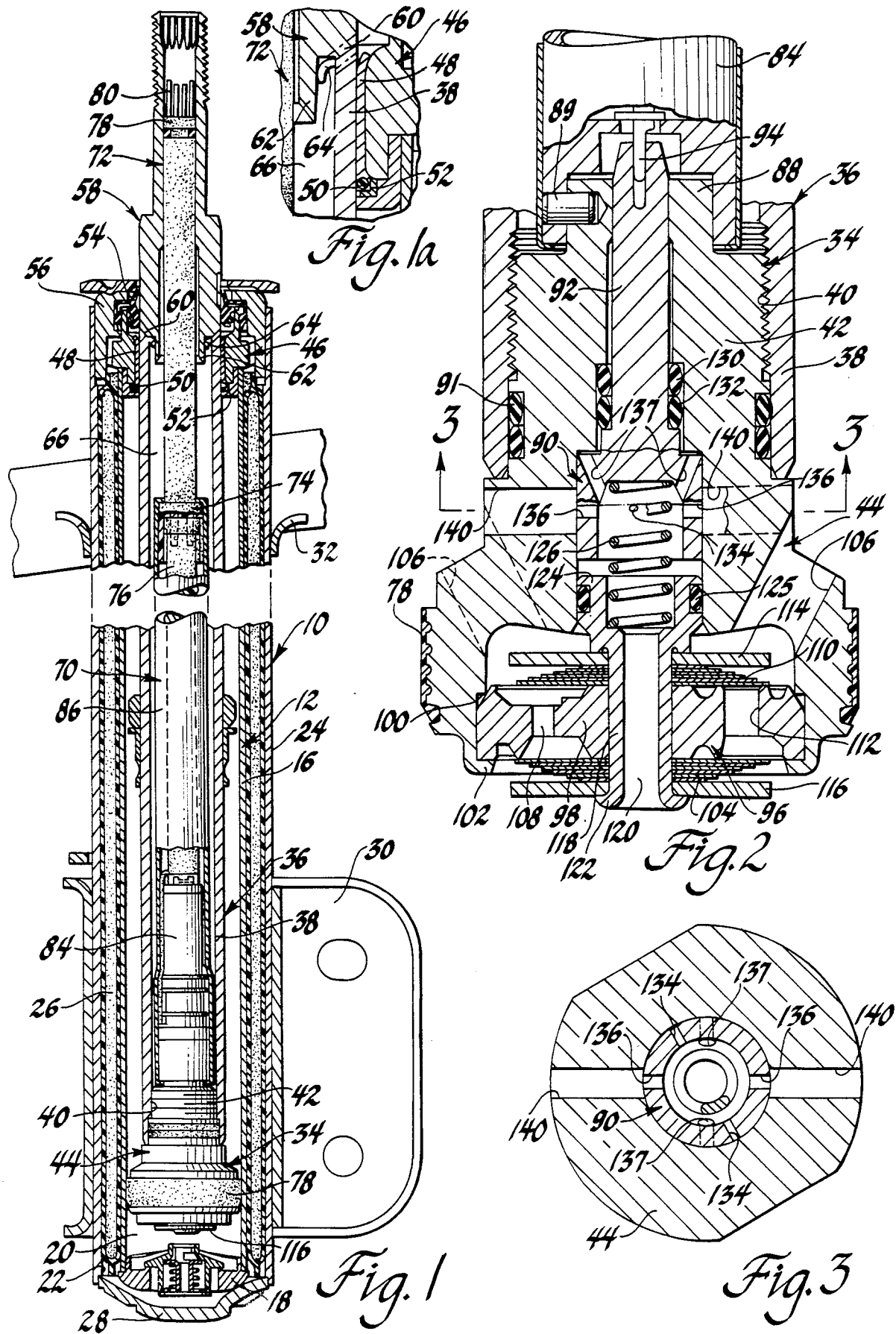

DAMPER WITH INTERNALLY POWERED SELECTIVE RIDE VALVING

This invention relates to shock absorbers and suspension struts with double-acting dampers for controlling the action of vehicle suspension springs. More particularly, the damper of this invention features a new and improved variable valve and actuator package providing optimized jounce and rebound control for hard, intermediate and soft rides.

In co-pending application Ser. No. 892,742, filed July 31, 1986, now U.S. Pat. No. 4,685,545, a selectively variable orifice damper is disclosed in which a selector is operatively mounted within a piston and is rotatably positioned by an actuator to selectively vary bypass orificing sized to accordingly vary the damping characteristics of the unit. With the construction disclosed in the above-referenced patent, there is selective and effective control or damping of the action of the vehicle suspension springs. With such variable orificing, the damper can be adjusted to suit the operator's requirements or automatically through a control programmed to match roadway conditions. For example, the damper may be selectively adjusted for flow restriction to provide for a hard ride for sports car performance, for an immediate ride for normal vehicle operation or for soft ride for boulevard rides.

The present invention is of the general category of that of the above-referenced patent but further provides new and improved double-acting hydraulic damper construction for shocks and struts in which the piston valving and the valving actuator are fully unitized for improved operation and improved installation and securement into a tubular piston rod. The piston of this invention has an enlarged head portion which houses deflectable spring disk jounce and rebound valving element and which has an upwardly extending neck that houses rotatably adjustable bypass valving. This bypass valving is a hydraulically balanced valve arrangement with equalized pressures on opposite sides to minimize turning torque requirements. This bypass valving is further hydraulically balanced axially with radial dual flow opening design. The neck of the piston readily threads into the internal diameter of an elongated hollow piston rod. More specifically, a selector valve rotatably mounted in the neck of the piston is movable to provide flow control through the bypass passage which parallels the main rebound and jounce valving for a wide range of selective damping actions.

An object of the present invention is to provide a new and improved damper for suspension spring having selectively variable damping characteristics provided by a selector controlled bypass valving housed within a piston and mounted above upper and lower spring disk valve packs that are secured to the upper and lower sides of a main valve plate by connector and flow passage means that hydraulically communicates with the selector.

Another object of this invention is to provide a new and improved damper for controlling the action of vehicle suspension springs which includes an actuator and orifice plate to provide restrictive flow through a connector to provide bypass passage in parallel with rebound and jounce control valving as defined by upper and lower spring disk packs.

Another object of this invention is to provide a new and improved damper with a selected range of jounce and rebound control and having a piston and valve assembly with minimized dead band height thereby increasing effective working length for improved control of the suspension springs of a vehicle.

These and other features, objects and advantages of this invention will become more apparent from the following detailed description and drawing in which:

FIG. 1 is a side elevational view partially in cross-section of a suspension strut according to this invention.

FIG. 1a is a fragment of the piston rod of this invention.

FIG. 2 is an enlarged cross-sectional view of a piston and piston rod assembly of FIG. 1.

FIG. 3 is a cross-sectional view taken generally along 3—3 of FIG. 2.

Figure 4:
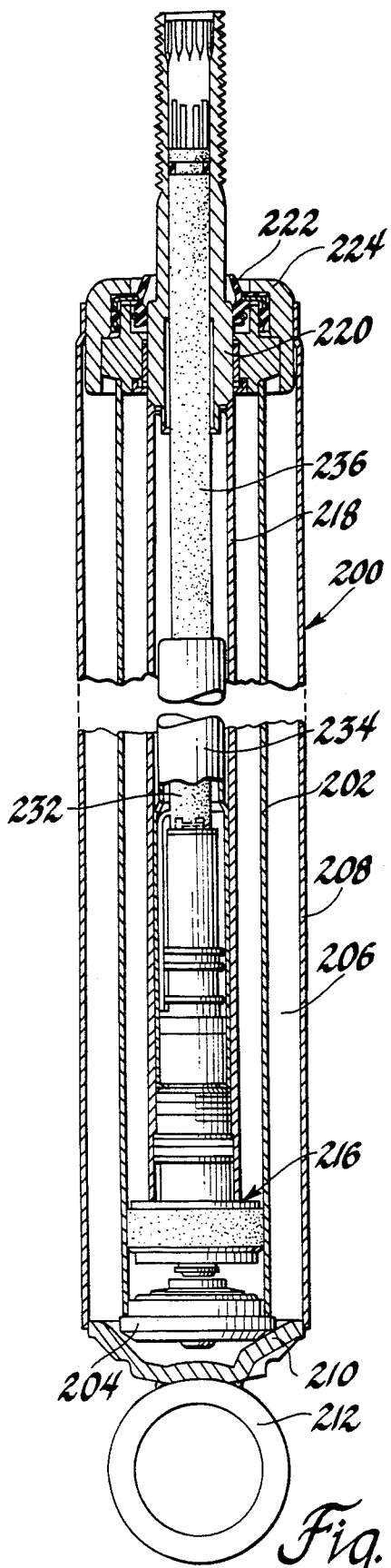
FIG. 4 is a side elevational view partly in cross-section of a shock absorber according to this invention.

Turning now in greater detail to the drawings, there is shown in FIG. 1 a suspension strut 10 incorporating a hydraulic double-acting damper 12 therein adapted to be operatively mounted between sprung and unsprung components of the vehicle. Such mounting is disclosed in U.S. Pat. No. 4,576,258, issued Mar. 18, 1986 to Spisak et al, assigned to the assignee of this invention and hereby incorporated by reference. The strut damper 12 has an elongated cylinder tube 16 having a conventional base valve 18 secured in a lower end thereof which controls the passage of oil between an inner variable volume chamber 20 of the cylinder tube and a surrounding oil reservoir 22 formed between the cylinder tube and an outer support tube 24. A "pliacell" bag 26 charged with gas is disposed in the reservoir 22 to prevent aeration of the oil in this unit as is known in this art. The support tube 24 is closed at its lower end by a base cup 28 on which the base valve 18 is seated. A bracket 30 welded to the exterior and lower end of the support tube 24 provides conventional connection to the steering knuckle of a road wheel assembly, not shown. Element 32 is a portion of a lower seat for a vehicle suspension spring which spirals upwardly onto the upper mount such as disclosed in U.S. Pat. No. 4,175,771, issued Nov. 27, 1979 to Muzechuk et al, assigned to the assignee of this invention and hereby incorporated by reference.

A valved piston and actuator assembly 34 with a connected piston rod assembly 36 assembly are operatively mounted for linear stroking movement in the cylinder tube 16 during damper operation. The piston rod assembly 36 has an elongated and relatively thin walled cylindrical tube 38 that extends upwardly from threaded connection 40 with the upstanding neck 42 of the piston 44 of the piston and actuator assembly 34 through a rod guide assembly 46 that includes a sleeve like low friction bushing 48 and a high pressure annular seal 50 of suitable plastics material trapped in position by annular retainer 52. With this construction, bushing 48 can be manufactured with a wide tolerance range. This rod guide assembly is mounted in the upper end of the cylinder tube 16. From the rod guide assembly 46, the piston rod assembly 36 extends through an annular elastomeric seal 54 and through a cup-like seal cover 56 whose annular depending peripheral flange fits into and is welded to the upper end of the support tube 24. The upper end of the piston rod assembly 36 is formed by a thick wall, stepped diameter tenon 58 which is friction welded at 60 to the upper end of the thin wall piston rod tube 38. The tenon has an outer diameter which matches that of the cylindrical tube 38 and has an inner wall 62 concentric with the upper end of the piston rod tube 38 to form a trap for the flash 64 of the friction weld.

The piston rod assembly 36 formed by tenon 58 and the elongated piston rod tube 38 has a centralized axial opening 66 for receiving the valved piston and actuator assembly 34, an electrical connector assembly 70, an electrical connector and bulkhead 72, all of which that fits within the piston rod assembly 36. The bulkhead has a lower headed end 74 having electrical connection to an upper end of ribbon cable 76 and an upper end 77 having terminals 80 for connection with a female socket with cables leading to control external of the strut 10 as in U.S. Pat. No. 4,576,258 cited above. The ribbon cable extends downwardly from the inner end of the bulkhead 72 into electrical connection with terminals on the upper end of an electric motor or actuator 84 of the piston and actuator assembly 34. An elongated tubular shell 86 of aluminum or other material is crimped over the cylindrical lower end of the actuator 84. The upper end of shell 86 crimped over the cylindrical end 74 of bulkhead 72 to provide a solid connection between the valve piston and actuator assembly 34 and the bulkhead 72. In this invention, the lower end of the actuator 84 provides a cylindrical end wall which closely fits over the reduced diameter cylindrical upper end 88 of the piston neck and is securely fastened thereto by pin 89. The unification of the actuator and the piston into an assembly improves manufacture and assembly into the piston rod and reduces any drive lash between these parts for optimized control as will be further described below. The interior of the piston rod is hydraulically sealed from the hydraulic fluid by annular seals 91 between the neck 42 of the piston and inner wall of the tubular piston rod.

The piston assembly has a cylindrical shell-like main body having upper flow passages therein and is peripherally bounded by a skirt of Teflon ® 78 or other suitable material having low friction sliding engagement with the inner wall of the cylinder tube 16. Mounted for axial rotational movement within the confines of the neck 42 of the piston assembly 44 is a rotatable orifice selector valve or plate 90 having an upstanding and stepped diameter drive shaft 92 directly keyed or otherwise connected to the rotatable and downwardly extending output 94 of the actuator 84. The piston 44 has a shell-like main body that houses an orifice plate assembly 96 that includes a cylindrical, relatively thick, fixed orifice plate 98. The orifice plate is peripherally secured in the main body of the piston between an inner locator shoulder 100 and an inwardly coined lower annular end 102. A lower valve spring disk pack 104 comprised of a series of flat washer-like valve disks of spring steel having decreasing diameter, top to bottom, is mounted adjacent to the bottom of the orifice plate to deflect downwardly in response to the forces of jets of hydraulic fluid thereon through passages 106 and 108 in rebound stroke (unit extension) to thereby control fluid flow through the orifice plate. An upper valve spring disk pack 110 similar to disk pack 104 comprised of a series of flat washer like valve discs is mounted adjacent to the top of the orifice plate which defects response to the force of jets of hydraulic fluid through passages such as passage 112 on compression to provide control of fluid flow through the orifice plate on jounce stroke as is known by those skilled in this art. The spring disk packs 104 and 110 are held in operative position between upper and lower limit plates 114, 116 by a centralized connector 118 having a flow opening 120 therethrough a lower coined end 122 and a cylindrical cup-like upper head 124 shown in FIG. 2. An elastomer O-ring seal 125 blocks peripheral fluid passage past the head 124. A helical inertia spring 126 interposed between the head 124 of the connector and the interior of the selector plate 90 opposes the inertia of these parts during damper operation and eliminates the need for special fasteners.

The selector valve 90 is piloted in the bore through the neck of the piston and O-ring seals 130 and 132 prevent oil from entering into the cavity of the piston rod.

The selector valve 90 has radial flowrestricting, selector openings or passages 134 an 136 providing different flow capacity or restriction therethrough which can be rotated into registry with cross passages 140 extending radially through the neck of the piston for controlling the flow of shock absorber fluid through the connector 118. The first passage 134 has the smallest diameter and capacity while the second passage 136 is progressively larger in diameter and fluid handling capacity. Selector valve rotation is controlled by the actuator 84. The selector valve is hydraulically balanced for low torque rotation by the actuator by the provision of passages 137 hydraulically connecting the upper and lower sides of this valve element. Also, hydraulic balance is provided by the opposing cross passages 140, and opposing cross passages 134 and 136.

By rotating the selector valve to selected positions by control of actuator 84, various combinations of flow control orifices can be chosen to set the rebound and jounce damping characteristics of the shock absorber to meet the operator's requirements and demands. For example, if the selector valve is rotated to the FIG. 3 position in which the large diameter restrictive passages 136 are open, rebound damper oil can flow through radial passages 140 in the neck of the piston, the radial passages 136 in selector valve 90 and in axial passage 120 in parallel to the flow through the restricted passages 108 in the orifice plate 98 to effect the first and lower damping force. With this selection the hydraulic damper has lowest damping force for boulevard type ride. In the event that the operator desires an intermediate ride, the selector valve 90 is rotated counterclockwise from the FIG. 3 position until the radial passages 134 are aligned with cross passage 140. In this condition, the suspension spring damping capability of the shock absorber is increased and piston velocity on rebound stroke is decreased. The vehicle ride is accordingly at an intermediate condition.

If a hard ride is desired the selector valve 90 may be selectively rotated so that the opening 120 is completely blocked by the selector valve. During rebound, since flow through the passage in parallel with the passage through the orifice plate is blocked to its maximum degree, valve restriction is highest and resistance to piston movement is at its highest. With this action, the suspension spring rate is in effect, increased providing a substantially hard ride for sports car handling.

On jounce with the piston assembly moving downwardly in the cylinder tube, the fluid in the cylinder tube below the piston will flow through the passage 112 and deflected spring disk pack 110 as well as thorough the restricted passage as selected through the orifice plate to vary damping forces. However, since the jounce loads are lighter, the curve spread and damping selection is reduced.

While this invention discloses three different independently selected flow control passages, additional passages can be provided so that flow rates through the piston on rebound can be further varied for further tailoring of shock absorber action. Jounce control is similar to that described for rebound control.

Turning now to FIG. 4, there is shown a hydraulic, double-acting shock absorber 200 which is generally like damper 10 of the strut operatively mounted between sprung and unsprung components of the vehicle in a conventional manner to check the action of vehicle suspension springs. The damper 200 incorporates an elongated cylinder tube 202 having a conventional base valve 204 secured in the lower end thereof which controls the passage of oil between the cylinder tube and a surrounding oil reservoir 206 formed between the cylinder tube and a reservoir tube 208. The reservoir tube 208 is closed at its lower end by a base cup 210 on which the base valve 204 is seated. A lower mount 212 welded to the exterior of the base cup provides conventional connection to an upsprung portion of the vehicle.

A valved piston assembly 216 and connected piston rod 218 corresponding to that of the strut of FIG. 3 are operatively mounted for linear stroking movement in the cylinder tube during shock absorber operation. Piston rod 218 extends upwardly from the piston assembly 216 through a rod guide 220 mounted in the upper end of the cylinder tube, an annular elastomeric seal 222 and through a cup-like seal cover 224 whose peripheral flange fits into and is welded to the upper end of the reservoir tube 208. The upper end of the piston rod 218 may be connected by a suitable elastomer mounting to the sprang portion of the vehicle.

The piston assembly 216, the selector valve 226, the actuator 228 connected by pin 230 to the neck of the piston, the ribbon cable 232 and housing 234 and the bulkhead and electrical connection 236 are the same as in the first embodiment. With this construction, these components can be unitized and axially inserted into the hollow piston rod 218 and, by turning, connected thereto by the screw threads 238 as in the first embodiment. This ready connection can be made even more secure by staking the piston rod to the threading of the neck of the piston as indicated at 240.

Figure 5:
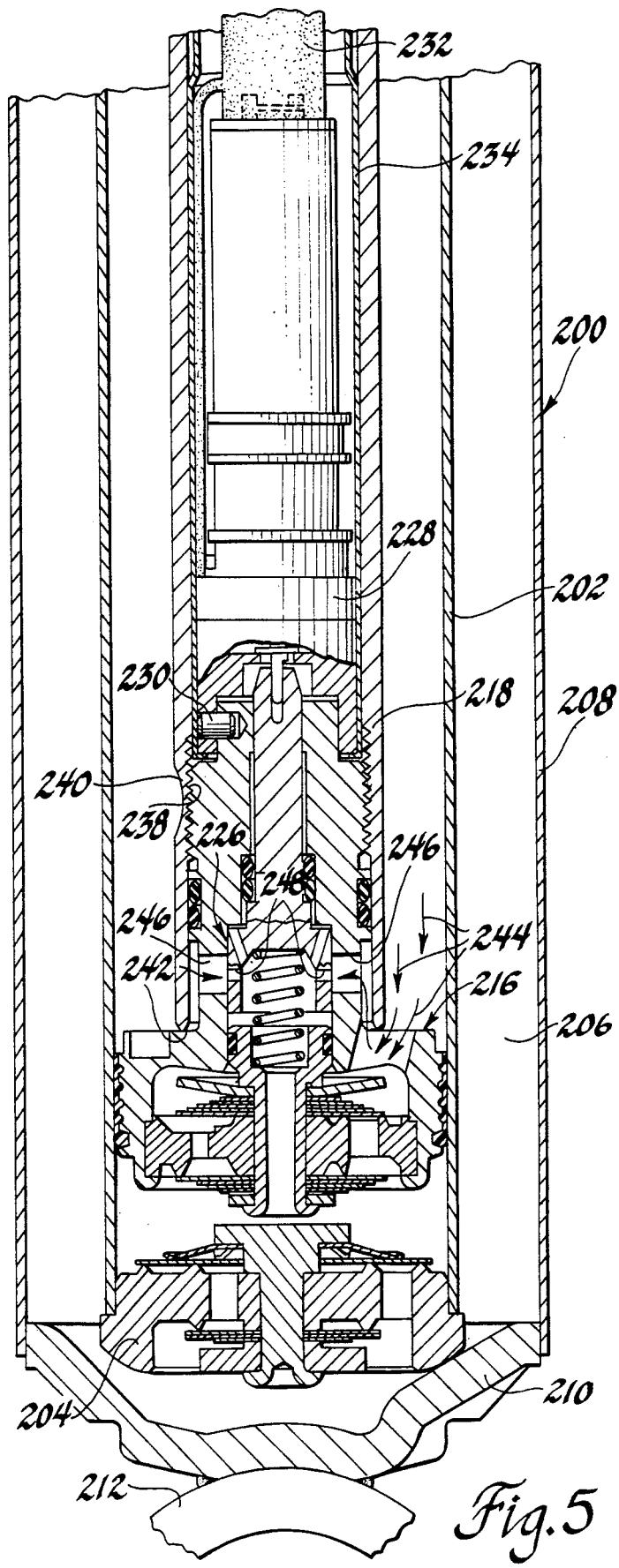
FIG. 5 is an enlarged view primarily in section of the lower half of the shock absorber of FIG. 4 showin the piston valving and operation thereof.

The damper operation and selection of ride characteristics are the same as in the strut embodiment. However, with this embodiment, foreshortening of the shock absorber unit is provided by advancing the piston rod 218 so that the lower end 242 contacts the top of the piston body as shown in FIG. 5. Rebound flow shown by flow arrows 244 rounds the lower end of the piston rod and flows upwardly between the piston rod and the neck of the piston and then into the cross passages 246 in the neck of the piston. The flow is then through the selected restriction such as at 248. With this construction there is optimized stroke with reduced overall length and attendant advantages in vehicle design.

The embodiments of the invention in which an exclusive property or privilege is claimed are defined as follows:

1. A double-acting hydraulic damper for controlling the action of vehicle suspension springs comprising an outer tube, a cylinder tube mounted within said outer tube and cooperating therewith to form a reservoir for damper fluid, base valve means hydraulically connecting said reservoir to said cylinder tube, a piston rod guide mounted in the upper end of said cylinder tube, a hollow cylindrical piston rod mounted for reciprocating movement in said cylinder tube and extending through said rod guide and the upper end of said damper, the improvement comprising a piston having a head and having an elongated neck integral with said head, said neck having a major portion fitted within an inner end of said piston rod, fastener means securing said neck within said inner end of said piston rod, an orifice plate operatively mounted within the confines of said head having jounce and rebound valve means associated with said orifice plate for restricting the passage of damper fluid therethrough on jounce and rebound stroke of said damper, connector means for securing said jounce and rebound valve means to said orifice plate and having a bypass fluid passage therethrough and selectively variable orifice valve means in said neck and head of said piston operatively connected to said bypass fluid passage and in hydraulic parallel with said jounce and rebound valve means for selectively changing the damping characteristics of said damper.

2. The damper of claim 1 above and further comprising an actuator mounted directly to the top of said neck of said piston and having an output directly engaging and rotatably driving said second variable orifice drive means.

3. A double-acting hydraulic damper for controlling the action of vehicle suspension springs comprising an outer tube, a cylinder tube mounted within said outer tube and cooperating therewith to form a reservoir for fluid therein, base valve means hydraulically connecting said reservoir to said cylinder tube, a piston rod guide mounted in the upper end of said cylinder tube, a hollow thin-walled cylindrical piston tube mounted for reciprocating movement in said cylinder tube and extending through said rod guide and outwardly through the upper end of said damper, the improvement comprising a thick-walled tenon rigidly secured to the upper end of said tube with an outer diameter to match that of said piston tube, a piston fixed to the lower end of said piston tube, a piston plate assembly operatively mounted in said piston having first valve means for controlling the fluid therethrough in jounce and rebound and second valve means in said piston providing a hydraulic passage in parallel with said first valve means, and a lower connector extending through the first valve means to secure said first valve means to said piston and to provide an fluid passage therethrough for second valve means, said piston tube contacting said head of said piston to foreshorten the damper.

4. A double-acting hydraulic damper for controlling the action of vehicle suspension springs comprising an outer tube, a cylinder tube mounted within said outer tube and cooperating therewith to form a reservoir for fluid therein, base valve means hydraulically connecting said reservoir to said cylinder tube, a piston rod guide mounted in the upper end of said cylinder tube, a hollow thin-walled cylindrical piston tube mounted for reciprocating movement in said cylinder tube and extending through said rod guide and outwardly through the upper end of said damper, the improvement comprising a thick-walled tenon rigidly secured to the upper end of said tube with an outer diameter to match that of said piston tube, a piston fixed to the lower end of said piston tube, a piston plate assembly operatively mounted in said piston having first valve means for controlling the fluid therethrough in jounce and rebound and second valve means in said piston providing a hydraulic passage in parallel with said first valve means, lower connector means extending through the first vale means to provide a fluid passage therethrough for said second valve means, said piston tube contacting said head of said piston to foreshorten said unit and a helical inertia spring operatively interposed between said lower connector means and said second valve means.

5. A double-acting hydraulic damper for controlling the action of suspension springs comprising an outer tube, a cylinder tube mounted within said outer tube and cooperating therewith to form a reservoir for fluid therein, base valve means hydraulically connecting said reservoir to said cylinder tube, a piston rod guide mounted in the upper end of said cylinder tube, a hollow cylindrical piston tube mounted for reciprocating movement in said cylinder tube and extending through said rod guide and outwardly through the upper end of said damper, the improvement comprising a piston having a head and a neck portion integral with said head, said piston tube contacting said head of said piston to foreshorten the damper, a piston plate assembly operatively mounted within said head of said piston having jounce and rebound control valve means for controlling the fluid therethrough and selectively variable valve means rotatably mounted within said neck and head of said piston for hydraulically bypassing said jounce and rebound control valve means in said head of said piston to vary the energy dissipation ability of said damper, an electrically energizeable actuator directly mounted on said neck portion of said piston and directly driving said selectively variable valve means, an electric cable assembly mounted on said actuator and extending upwardly into said piston tube, and a seal and connector assembly within said piston tube and the connector assembly being electrically connected with said cable assembly for connection with control external of said damper.

* * * * *